United States Patent [19]

Van Ooijen

[11] Patent Number: 5,344,559

[45] Date of Patent: Sep. 6, 1994

[54] FILTER CARTRIDGE

[75] Inventor: Maarten H. Van Ooijen, Dilsen-Stokkem, Belgium

[73] Assignee: Votech Filter GmbH, Heinsberg, Fed. Rep. of Germany

[21] Appl. No.: 13,931

[22] Filed: Feb. 5, 1993

[30] Foreign Application Priority Data

Feb. 7, 1992 [DE] Fed. Rep. of Germany ..... 92102025

[51] Int. Cl.⁵ ............................................. B01D 29/11
[52] U.S. Cl. ..................................... 210/232; 55/492; 55/498; 210/485; 210/497.01
[58] Field of Search ................. 55/492, 498, 499, 502, 55/506, 510, 511, 515; 210/232, 484, 485, 493.5, 495, 497.01, 497.2

[56] References Cited

U.S. PATENT DOCUMENTS

| 1,710,758 | 4/1929 | Wright . | |
|---|---|---|---|
| 3,246,765 | 4/1966 | Murphy et al. | 210/484 |
| 4,138,234 | 2/1979 | Kubesa | 55/498 |
| 4,846,971 | 7/1989 | Lamort | 210/232 |
| 4,909,937 | 3/1990 | Hoffmann et al. | 210/315 |

FOREIGN PATENT DOCUMENTS

| 0187553 | 7/1986 | European Pat. Off. . |
| 2186279 | 1/1974 | France . |
| 2611147 | 8/1988 | France . |
| 2046614 | 11/1980 | United Kingdom . |

*Primary Examiner*—Ivars Cintins
*Attorney, Agent, or Firm*—Spencer, Frank & Schneider

[57] ABSTRACT

The invention relates to a filter cartridge including a filter element equipped with two annular flanges and two supporting cages. In order to be able to disassemble the filter cartridge for the purpose of facilitating disposal, the two annular flanges are provided with inner and outer threads. Four mounting rings are provided with mating inner and outer threads and can be screwed onto the annular flanges while being supported on the two supporting cages. Once the threaded rings are tightened, the filter element is under tension.

12 Claims, 3 Drawing Sheets

FILTER CARTRIDGE

CROSS REFERENCE TO RELATED APPLICATION

This application claims the priority of Application Ser. No. EP 92 10 2025.1, filed in the European Patent Office on Feb. 7, 1992, the subject matter of which is incorporated herein by reference.

BACKGROUND OF THE INVENTION

The invention relates to a filter cartridge including a hollow cylindrical filter element that is under axial tractive tension, and is provided with an annular flange at each one of its two ends and with at least one supporting cage arranged coaxial with the filter element.

Filter cartridges, equipped with the most varied filter materials, are used in petrochemical, food processing and pharmaceutical industries in increasing numbers, for filtering liquid and gaseous media.

The prior art cylindrical filter cartridges that are manufactured in large numbers are composed of a filter element equipped with flanges at its ends and with at least one cylindrical supporting cage which subjects the wound or pleated filter medium to tensile stresses. The filter element, its annular flanges and its supporting cage or cages have in the past been fixedly and non-releasably connected with one another during manufacture so that the disposal of spent filter cartridges is expensive. The filter cartridges are typically composed of various materials, for example, the filter medium of cellulose, ceramics or plastic, and the supporting body as well as the flanges of metal. Thus, to dispose of the cartridges according to its various materials, it is absolutely necessary that the different materials be separated. The dismantling of the spent filter cartridges required for this purpose raises not insignificant problems, such as being time consuming and expensive. Thus there is an urgent need for easily disposable filter cartridges.

SUMMARY OF THE INVENTION

It is an object of the invention to decisively improve the disposability of filter cartridges employed for the separation of single or multiple phases and manufactured of different materials.

To solve this problem, the present invention is based on a prior art filter cartridge equipped with a hollow cylindrical tensioned filter element which is provided with an annular flange at each of its two ends and is equipped with at least one supporting cage that is arranged coaxially with the filter element. The problem is solved by providing the aforementioned filter cartridge with at least one mounting ring between an annular flange and the supporting cage for establishing a releasable connection between the mounting ring and the supporting cage and by providing tensioning means between the mounting ring and the annular flange to tension the filter element, with the mounting ring being supported on the supporting cage.

The core of the invention is that the proposed filter cartridge is dividable and easily separated into its individual components. The filter element—composed of pleated or wound filter media of the most varied materials—and its attached annular flanges can be disposed of without problems in a manner that does not endanger the environment, while the supporting cage and the threaded ring (made, for example, of metal), after being cleaned, can be reused many times or separately disposed of in a metal recycling process. Another advantage is that the tensile stresses exerted on the filter element—which have a great influence on the effectiveness of the filter—can easily be set by appropriate tightening of the tensioning means.

It is appropriate for the annular flange to be made of plastic or a cellulose fiber material and to be fixed to the filter element by casting, injection molding or gluing.

According to another feature of the invention, the underside of the threaded ring is supported by the front edge of the respective supporting cage.

In view of the required stability and re-useability, the supporting cage as well as the mounting ring will preferably be made of metal.

For the purpose of proper centering, the mounting ring may be provided with an annular groove on its underside for accommodating the front edge of the supporting cage.

The annular groove may have a V-shaped profile which allows the groove to exert a clamping effect on the respective front edge of the supporting cage.

In order to avoid leakage in the installed filter cartridge, each annular flange may be provided with an annular seal at its upper face.

In a preferred embodiment of the filter cartridge, the annular flange of the filter element is provided with at least one thread and the mounting ring with a mating thread. In order to establish the releasable connection between the mounting ring and the supporting cage, the mating thread of the mounting ring can be screwed onto the thread of the annular flange. Together with the mating thread, the annular flange thread serves as a tensioning means for the filter element when the flange is screwed on.

Installation as well as disassembly of the filter cartridge can be accelerated if the annular flange thread and the mating thread are configured as multi-turn trapezoidal threads.

As a structural variation of the invention, the annular flange is provided with a ring of threaded bores. A single mounting ring is seated above the annular flange and is provided with screw holes that correspond to the threaded bores. Head screws penetrate the screw holes and are screwed into the threaded bores so as to provide the releasable connection between the mounting ring and the supporting cage. When tightened, these screws serve as tensioning means for the filter element. This embodiment is particularly suitable for filter cartridges having a larger diameter in which the manufacture of threads on the mounting ring and annular flange would be too expensive.

In another advantageous embodiment of the filter cartridge, the annular flange is provided with at least one annular shoulder and the mounting ring is provided with rotary cylinders that are distributed over its circumference and are provided with eccentric pins. The pins pass underneath the annular shoulder in order to establish the releasable connection between the mounting ring and the supporting cage, and the rotary cylinders serve as tensioning means which, when rotated, tension the filter element.

Another embodiment very suitable for particularly large filter cartridges comprises providing the annular flange with laterally disposed blind bores and with at least one annular ledge underneath the blind bores and further providing a traction ring that is coaxial with the annular flange. In order to establish the releasable connection between the mounting ring and the supporting cage, the traction ring is provided with radial holding screws that engage in the blind bores. To tension the filter element, tensioning screws pass through the traction ring and rest on the annular flange. The mounting ring is provided with at least one annular groove on its side in order to accommodate the annular ledge of the annular flange.

BRIEF DESCRIPTION OF THE DRAWINGS

The invention will now be described in greater detail with reference to several embodiments thereof that are illustrated in the three attached drawing figures in which.

DETAILED DESCRIPTION OF THE PREFERRED EMBODIMENTS

Figure 1:
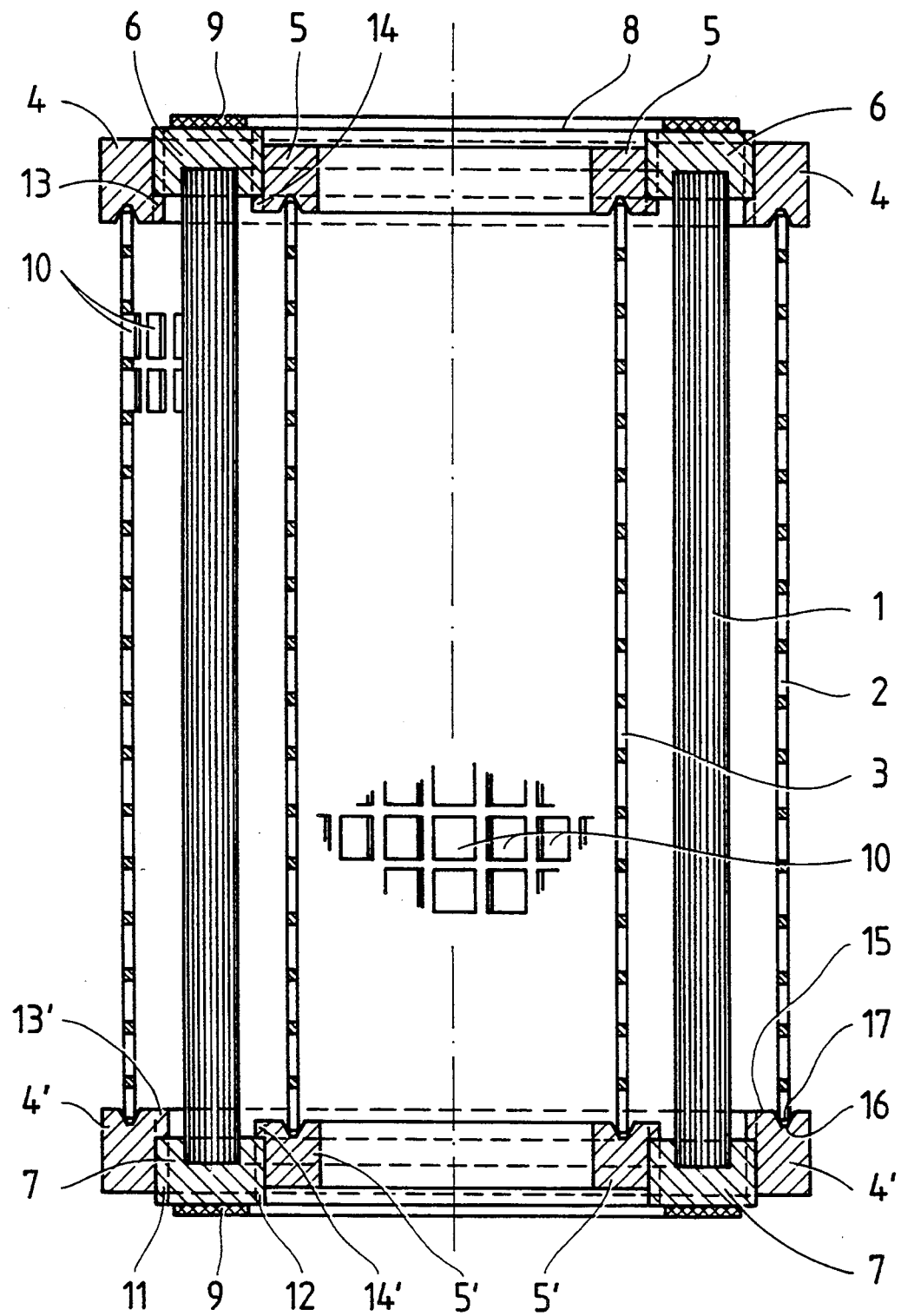
FIG. 1 is a vertical sectional view in approximately natural size of a filter cartridge equipped with two supporting cages and two mounting rings.

The circularly cylindrical filter cartridge shown in FIG. 1 comprises a filter element 1, a first, outer supporting cage 2, a second, inner supporting cage 3, an upper outer mounting ring 4, a lower outer mounting ring 4' as well as an upper inner mounting ring 5 and a lower inner mounting ring 5'. The filter cartridge can easily be disassembled into these components which all have a common axis, that is, they are arranged coaxially.

Filter element 1 has a hollow cylindrical configuration. It is made of a wound or creased (pleated) filter medium that may be composed of different materials such as glass, ceramics, plastic fibers, cellulose in the form of paper or a non-woven structure, felt, woven fabric or staple fibers. At each of its two ends, filter element 1 is provided with an upper annular flange 6 and a lower annular flange 7. These two circular ring-shaped annular flanges 6 and 7 have a rectangular cross section, are of identical shape and are each fixed permanently to filter element 1 and its filter medium, respectively.

The two annular flanges 6 and 7 are made of a plastic or cellulose fiber material that is disposable and biologically degradable. The flange material is resistant to the medium to be filtered, and is preferably cast onto the two ends of the filter element 1 but may also be injection-molded on. However, the annular flanges 6 and 7 may also be attached by means of a suitable adhesive. Each annular flange 6 and 7 is provided at its upper face 8 with a circular ring shaped flat annular seal 9 comprised of an elastic material so as to prevent leakage flow once the filter cartridge is installed.

The two supporting cages 2 and 3 have a circular cylindrical configuration and are comprised of a metal sheet made, for example, of stainless steel or rust protected steel sheet or aluminum and are provided with holes or openings 10. However, the cages may also be made of rib mesh or of a wire screen material. Both supporting cages 2 and 3 are arranged coaxially with filter element 1 and have different diameters; filter element 1 is seated between the first, outer supporting cage 2 and the second, inner supporting cage 3. The circularly cylindrical spaces shown between the two supporting cages 2 and 3 and filter element 1 for better clarity actually do not exist. In reality, filter element 1 fills all of the space between the two supporting cages 2 and 3.

Each one of the two annular flanges 6 and 7 is provided with a first, outer thread 11 and a second, inner thread 12. Both threads 11 and 12 may be multi-turn trapezoidal threads.

When the filter cartridge is assembled, filter element 1 is releasably connected with the two supporting cages 2 and 3 by means of the two upper and lower outer mounting rings 4 and 4' and the two upper and lower inner mounting rings 5 and 5'. The four mentioned mounting rings are made of metal, for example, aluminum. The two outer mounting rings 4 and 4' are provided with interior mating threads 13 and 13' and the two inner mounting rings 5 and 5' are provided with exterior mating threads 14 and 14'. The four mounting rings 4, 4' and 5, 5' are screwed by means of their mating threads 13, 13' and 14, 14' onto the threads 11 and 12 of the two annular flanges 6 and 7. Mounting rings 4, 4' and 5, 5' are supported by the outer and inner supporting cages 2 and 3, respectively. Together with the respective mating threads 13, 13' and 14, 14', the two threads 11 and 12 establish releasable connections between mounting rings 4, 4', 5 and 5' and the two supporting cages 2 and 3.

At their respective facing undersides 14, the four mounting rings 4, 4', 5 and 5' are each provided with an annular groove 16 for accommodating the front edge 17 of the respective supporting cage 2, 3. This annular groove 16 has a V-shaped profile.

During assembly of the filter cartridge, the four mounting rings 4, 4', 5 and 5' are screwed onto the threads 11 and 12 of annular flanges 6 and 7 of filter element 1 which exerts a certain axially oriented tensile stress on filter element 1 and its filter medium fastened to the annular flanges 6 and 7 as soon as a slight rotary force is generated. Thus, the filter medium is tensioned as is absolutely necessary for proper filter operation.

The filter cartridge can be easily disassembled into its components by releasing the four mounting rings 4, 4' and 5, 5'. Filter element 1, including the filter medium and the two annular flanges 6 and 7, can be disposed of while the metal supporting cages 2 and 3 as well as the four metal mounting rings 4, 4', 5 and 5' (possibly together with annular seals 9) can be cleaned and re-used.

Figure 2:
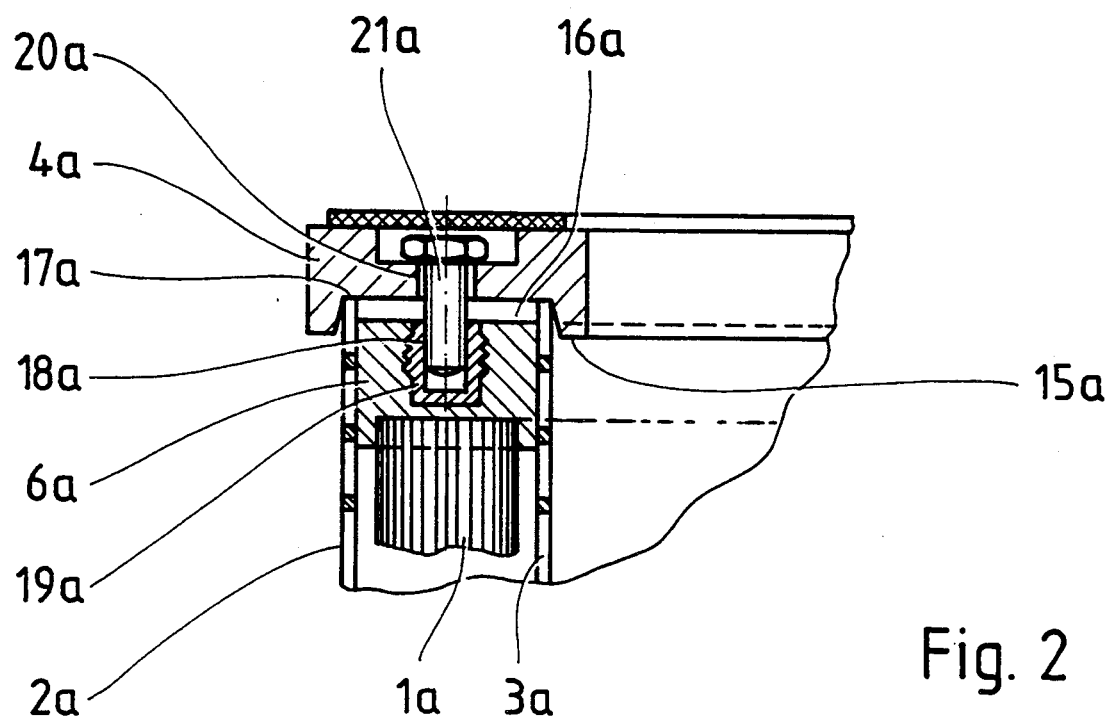
FIG. 2 is a partial vertical sectional view of another filter cartridge equipped with two supporting cages and one mounting ring.

Another, second embodiment of the filter cartridge is illustrated in the partial view of FIG. 2. In principle, this filter cartridge corresponds to that of FIG. 1, but it has only a single upper mounting ring 4a (and possibly a lower mounting ring).

The upper mounting ring 4a is seated above the upper annular flange 6a. Annular flange 6a is provided with a ring of threaded bores 18a at its end face. The threaded bores 18a are part of threaded sleeves 19a. Threaded sleeves 19a are cast into the annular flange 6a. Preferably, annular flange 6a is comprised of plastic—for example, polyurethane, polystyrene or epoxy resin—as is filter element 1a. Annular flange 6a is seated between the outer supporting cage 2a and the inner supporting cage 3a. The underside 15a of the upper mounting ring 4a is provided with a broad annular groove 16a for accommodating the front edges 17a of the two supporting cages 2a and 2b.

Mounting ring 4a is provided with a ring of screw holes 20a that are distributed over its circumference and correspond to and are flush with, threaded bores 18a. Mounting ring 4a is releasably connected with annular flange 6a by means of a number of head screws 21a that correspond to the number of screw holes 20a. Filter element 1a is tensioned by tightening of head screws 21a.

Figure 3:
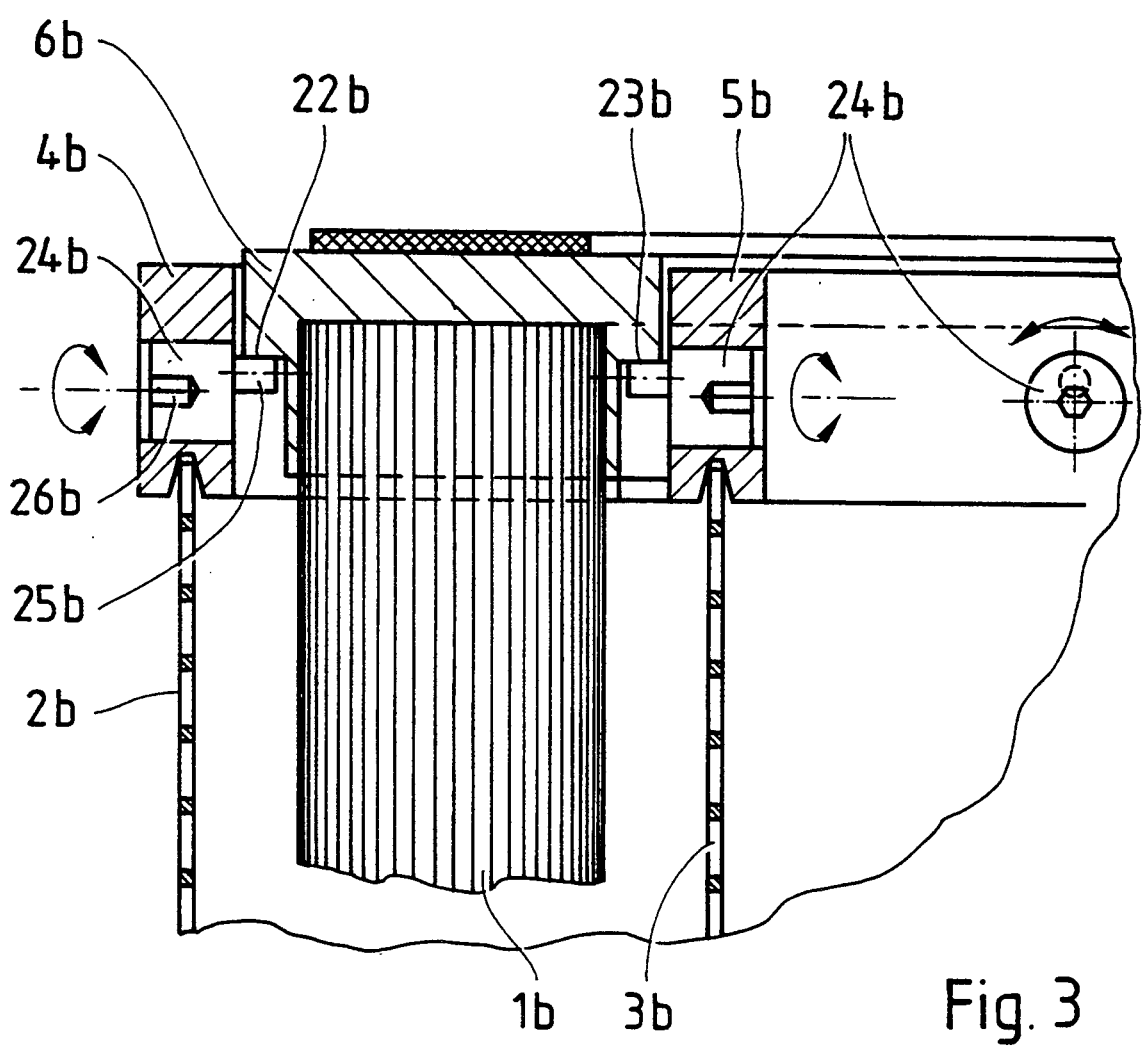
FIG. 3 is a partial vertical sectional view of a further filter cartridge equipped with two supporting cages and two mounting rings equipped with eccentrics.

Another, third variation of the filter cartridge discussed in detail already in connection with FIG. 1 is shown in FIG. 3 to the extent required for understanding. In this filter cartridge, the upper annular flange 6b is provided with an outer annular shoulder 22b that extends around its entire circumference and with an inner annular shoulder 23b. Rotary steel cylinders 24b, each provided with an eccentric pin 25b, are worked into the outer upper mounting ring 4b and the inner upper mounting ring 5b, in each case distributed over the ring circumference. These pins 25b engage underneath annular shoulders 22b and 23b, respectively, and thus establish the releasable connection between the respective mounting ring 4b and 5b and the outer supporting cage 2b and the inner supporting cage 3b, respectively. Rotary cylinders 24b, which serve as tensioning means, are provided with an internal hexagon bore 26b for their actuation and, if turned according to the arrows, tension filter element 1b.

Figure 4:
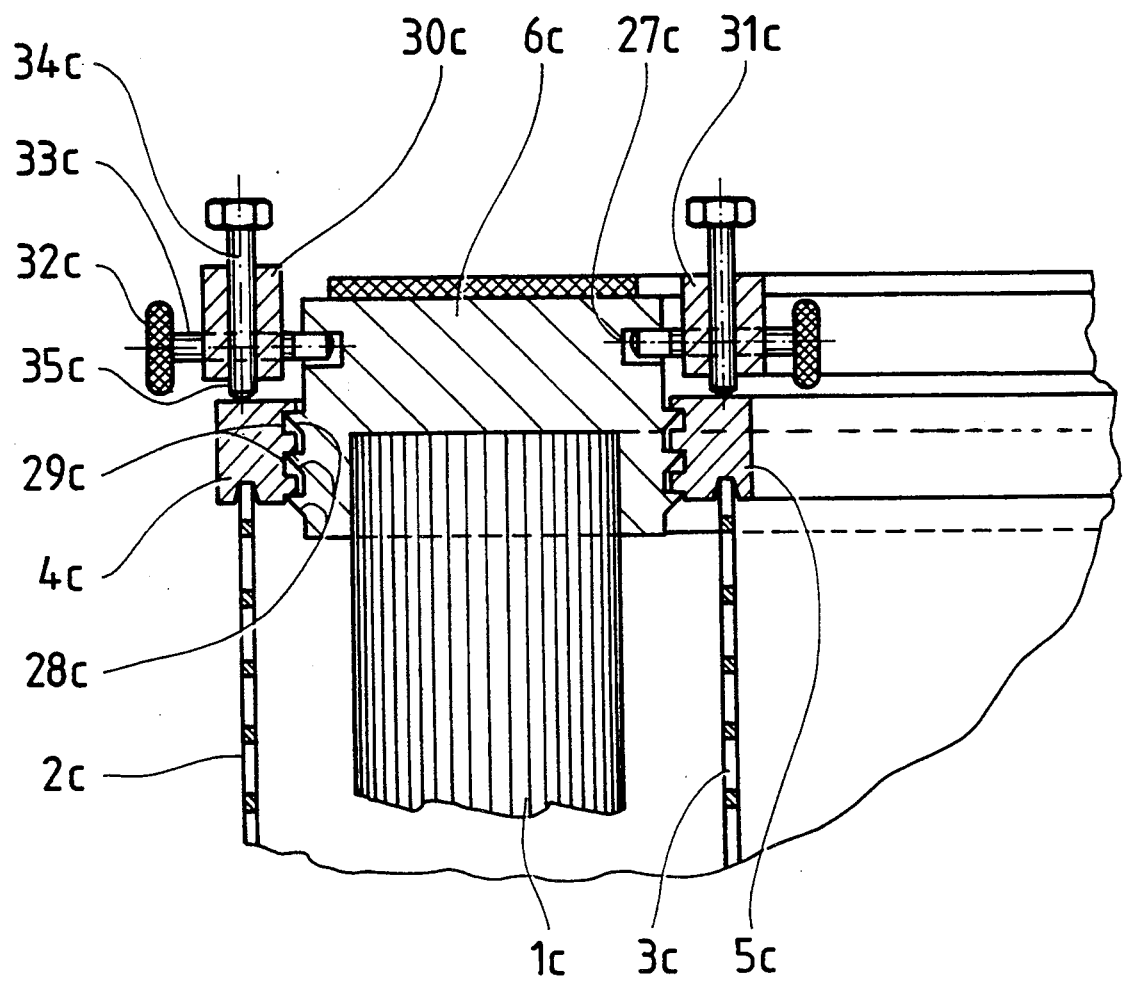
FIG. 4 is a partial vertical sectional view of a fourth filter cartridge equipped with two supporting cages, two mounting rings and two traction rings.

A fourth embodiment of the filter cartridge is shown in FIG. 4. Here the upper annular flange 6c is provided with blind bores 27c that are arranged laterally on the exterior and interior of the flange and are distributed over its circumference. Annular flange 6a is also provided with annular ledges 28c having a sawtooth-shaped cross section below the blind bores 27c. The upper outer mounting ring 4c and the upper inner mounting ring 5c each are provided with circumferential annular grooves 29c into which engage the annular ledges 28c. An outer traction ring 30c and an inner traction ring 31c, both made of metal, are disposed above each mounting ring 4c and 5c, respectively, and coaxially therewith. In order to establish the releasable connection between mounting rings 4c and 5c, respectively, and the outer supporting cage 2c as well as the inner supporting cage 3c, respectively, the two traction rings 30c and 31c are provided with holding screws 33c that are arranged radially in threads and are provided with knurled heads 32c. Holding screws 33 engage in blind bores 27c. Moreover, traction rings 30c and 31c are penetrated by a ring of tensioning screws 34c, each equipped with a hexagonal head, whose ends 35c rest on the top faces of mounting rings 4c and 5c therebelow and thus serve as tensioning means for tensioning filter element 1c.

It will be understood that the above description of the present invention is susceptible to various modifications, changes and adaptations, and the same are intended to be comprehended within the meaning and range of equivalents of the appended claims.

What is claimed is:

1. A filter cartridge comprising:
    a hollow cylindrical filter element having two axial ends and being under axial tension
    an annular flange at each one of said two axial ends;
    at least one supporting cage coaxial with the filter element;
    at least one mounting ring between the annular flange at one of said axial ends and the supporting cage for establishing a releasable connection between the mounting ring and the supporting cage; and
    tensioning means between the mounting ring and the annular flange for tensioning the filter element, with the mounting ring being supported on the supporting cage.

2. A filter cartridge according to claim 1, wherein said annular flange is comprised of plastic or a cellulose filter material and is fixed to the filter element by casting, injection molding or gluing.

3. A filter cartridge according to claim 1, wherein said supporting cage has a front edge and said mounting ring has an underside which is supported by said front edge of the supporting cage.

4. A filter cartridge according to claim 1, wherein said supporting cage and the mounting ring are comprised of metal.

5. A filter cartridge according to claim 1, wherein said supporting cage has a front edge and said mounting ring has an underside having an annular groove to accommodate said front edge of the supporting cage.

6. A filter cartridge according to claim 5, wherein said annular groove has a V-shaped profile.

7. A filter cartridge according to claim 1, and further comprising an annular seal on said annular flange.

8. A filter cartridge according to claim 1, wherein
    the annular flange of the filter element includes at least one thread;
    the mounting ring includes a corresponding mating thread for screwing onto the thread of the annular flange and establishing said releasable connection between the mounting ring and the supporting cage; and wherein said tensioning means comprises the annular flange and the corresponding mating thread.

9. A filter cartridge according to claim 8, wherein said annular flange thread and the corresponding mating thread are multi-turn trapezoidal threads.

10. A filter cartridge according to claim 1, wherein
    the annular flange includes a ring of threaded bores; and
    the mounting ring is seated above the annular flange and includes corresponding screw holes that mate with the threaded bores; and further comprising head screws penetrating the screw holes and screwed into the threaded bores for establishing the releasable connection between the mounting ring and the supporting cage and, when tightened, serving as tensioning means for the filter element.

11. A filter cartridge according to claim 1, wherein
    the annular flange includes at least one annular shoulder; and said tensioning means comprises rotary cylinders distributed over the circumference of said mounting ring, said rotary cylinders having eccentric pins engaging underneath the annular shoulder to establish the releasable connection between the mounting ring and the supporting cage whereby the rotary cylinders, when rotated, tension the filter element.

12. A filter cartridge according to claim 1, wherein the annular flange has a side having plural blind bores and at least one annular ledge underneath said blind bores and wherein the mounting ring has a side having at least one annular groove for accommodating said annular ledge;

and further comprising a traction ring coaxial with said annular flange having radial holding screws for engaging the blind bores so as to establish the releasable connection between the mounting ring and the supporting cage, said traction ring further including plural tension screws penetrating said traction ring and resting on said annular flange, whereby the traction ring serves as the tensioning means for tensioning the filter element.

* * * * *